CODE RECOGNITION CIRCUIT

Filed Aug. 21, 1958

Inventors
VLADMIR P. HONEISER
HOWARD S. MARGETTS
By Philip M. Bolton
Attorney 3,007,138
Patented Oct. 31, 1961

3,007,138

CODE RECOGNITION CIRCUIT

Vladimir P. Honeiser, Paramus, and Howard S. Margetts, Lincoln Park, N.J., assignors to International Telephone and Telegraph Corporation, Nutley, N.J., a corporation of Maryland Filed Aug. 21, 1958, Ser. No. 756,321
7 Claims. (Cl. 340—172.5)

This invention relates to a data processing system, and more particularly to a circuit for recognizing or identifying a particular code pattern on a record.

In data processing systems, information in coded form is applied to a record-bearing medium. The record-bearing medium, for example, may be a punched card, magnetic tape or drum, or film. The code is usually applied in a format consisting of a plurality of rows and columns of informational bits or marks. Each row, for example, may contain an index mark followed by a plurality of data marks.

In many data processing systems two or more code formats may be employed for the storage of different information. For example, it may be desired to record a person's name in letter form on a punched card, and also to store information concerning this person in code. Another system in which two different forms of information are stored on a common record-bearing medium is disclosed and claimed in copending application of R. L. Whittle et al., Serial No. 761,407, filed September 16, 1958, for Data Processing System, and assigned to the assignee of this application. In the invention disclosed in the copending application, pictorial information was printed on film and certain data relating to the pictorial information was also printed on each frame of the film.

In that system, as in most data processing systems, there was the problem of distinguishing the code pattern from other information which may be contained on the same record-bearing medium. For example, in the photographic system mentioned above, the film frame was scanned by a light beam. Since the picture frame included pictorial information, in addition to the code format, it was essential to distinguish the code format in order to read out the code.

This invention is directed to a circuit for recognizing a code format which may either appear by itself on the record-bearing medium or with other additional information.

Accordingly, it is a primary object of this invention to provide a code recognition circuit which is capable of identifying a particular code from other information which may appear on the same record medium.

It is a further object of this invention to provide a column recognition circuit for use with a multi-column code format.

It is still a further object of this invention to provide a system, comprising a moving record including a circuit for identifying a particular recorded code format and for providing a signal for automatically stopping the record when the desired code format is detected.

In accordance with an aspect of this invention, there is provided a circuit for detecting a coded record which contains a plurality of informational bits arranged in a plurality of rows and columns. The recognition circuit comprises means for scanning the record and producing a succession of pulses corresponding to the information bits. The pulses are applied to a counter which is preset to produce a signal upon receiving a predetermined number of pulses. The scanning means also produces a pulse upon completely scanning the record. This pulse is delayed so that the time duration thereof is slightly less than the duration of the predetermined number of pulses. The trailing edge of the delayed pulse is used to trigger a pulse generator, which produces a pulse of a duration equal to the time of a given number of informational pulses, the given number being a small fraction of the total number of pulses in a column. The generated pulse and the output signal from the counter are applied to a coincident gate, whereby an output therefrom is an indication that the scanning means is scanning the desired code pattern.

The above-mentioned and other features and objects of this invention and the manner of attaining them will become more apparent and the invention itself will be best understood by reference to the following description of an embodiment of the invention taken in conjunction with the accompanying drawings, wherein.

The invention will be described in connection with a particular data processing system for which the code recognition circuit was developed. However, the utility of the invention in connection with other forms of data processing systems will immediately be apparent to one skilled in the art.

Figure 1:
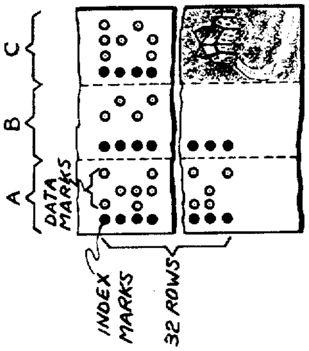
FIG. 1 shows a multicolumn format.
Figure 2:
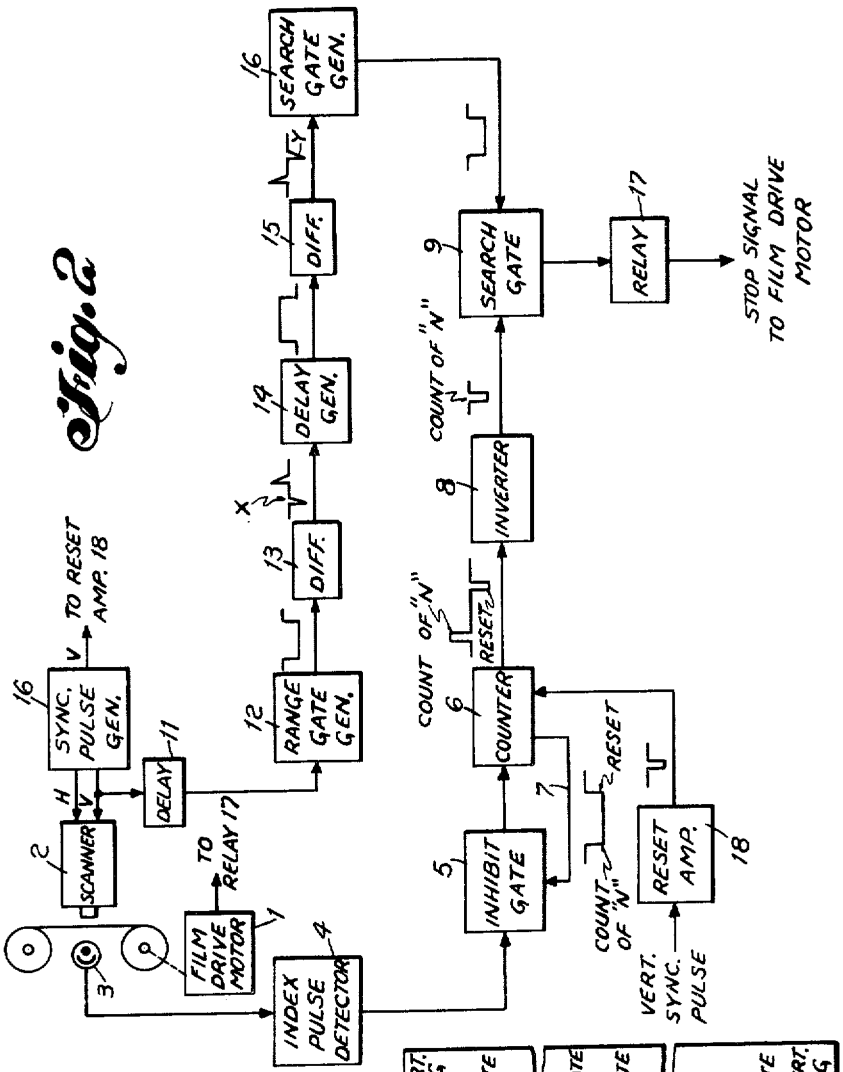
FIG. 2 is a schematic diagram of the code recognition circuit.

Referring first to FIG. 1, there is shown a code format comprising a plurality of columns A, B and C, each column containing a plurality of parallel rows; the particular number of rows being determined by the amount of information it is desired to store on the record. Each row within a column contains a plurality of information bits or marks. The first mark in each row is customarily an index mark and the marks following the index mark are data marks. As explained previously, the code information may occupy a relatively small portion of a discrete area of the total record. For example, a record may be a film frame containing pictorial information and in a corner of the frame, the code format as shown in FIG. 1.

The film, which in the illustrated embodiment constitutes the record-bearing medium, is driven by a film motor drive 1, while the film is being scanned by, for example, a flying spot scanner, shown generally at 2.

As the film is being moved through the optics of the flying spot scanner, video pulses are produced by a photosensitive device 3, forming part of the scanner, which pulses are applied to an index pulse detector 4. The photosensitive device 3 responds to the intensity of the scanning light beam passing through the film. While the beam is traversing the pictorial information, a complex array of signals is being delivered to the index pulse detector. These signals are rejected by the detector 4 which is designed to select only the video pulses which result from the light beam passing over an information mark. Since the informational marks are of predetermined size and opacity, the amplitude of the signals corresponding to the information marks are predetermined and, therefore, capable of separation from the other signals. A suitable index pulse detector circuit, which detects the troughs of the signals between pulses corresponding to informational marks, is disclosed in copending application of V. Honeiser, Serial No. 735,267, filed May 14, 1958, for Signal Detector, and assigned to the assignee of this application.

The output of the index pulse detector is pulses corresponding to the index marks in a particular column, i.e., A, B or C, in the code format. The index pulse detector is adjusted to select the index mark from any one of the three columns. However, while the film is moving, that is, before the code area has been detected and while the circuit is "searching" for the coded area, the index pulse detector is adjusted to select the index mark in the first column.

Thus, pulses corresponding to the index marks, one pulse for each row, are applied through an inhibit gate 5 to a counter 6. The counter 6 is preset to produce a signal upon receiving a predetermined number of index pulses. Assuming that the code format comprises 32 rows in each of the columns, the counter could be set to count each of the rows in a column. However, this would place a rigid demand on the design of the equipment, and would not allow for the possible missing of an index mark. It is, therefore, advisable to select a count less than 32, but one which is compatible with the known electronic counters. For example, if the format contained 32 index marks in a column, a count of 16 has been found to be most practical. The counter 6 may comprise a plurality of binary counters, such as Eccles-Jordan multivibrators. Upon the counter receiving 16 pulses, a signal is fed back over line 7 to the inhibit gate to close the gate to any more index pulses during the scanning of a frame. The counter 6, upon recording a count of 16, also supplies a signal to inverter 8; the output from the inverter being applied to a coincident "search" gate 9.

To recapitulate the operation of the circuit thus far, when 16 pulses are applied to the counter 6 within one frame of scanning, a signal is applied to the "search" gate 9. However, it has not yet been definitely determined that the 16 pulses correspond to the 16 index marks in the first column. For example, it is possible, although not probable, that the pictorial information may produce pulses similar to those produced by the index marks. It is necessary, therefore, to make reasonably certain that the scanning equipment is "looking" at the code marks.

To reduce the probability of a faulty count, the following circuit is provided.

The line and frame scanning rate of flying spot scanner 2 is controlled by a synchronizing pulse generator 10, which produces the horizontal and vertical synchronizing pulses. The scanning rates are preferably the standard U.S. T-V scanning rates.

Figure 3:
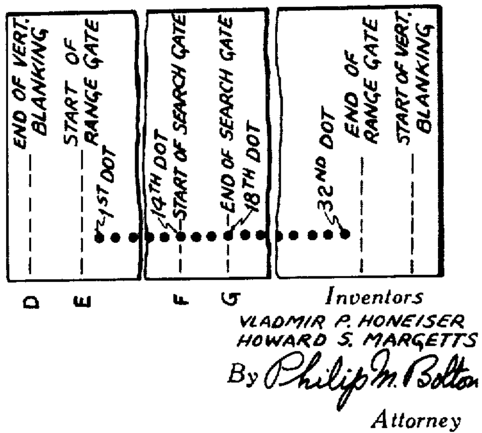
FIG. 3 is a time chart showing the occurrence of the various signals generated by the recognition circuit illustrated in FIG. 2.

The vertical pulse which is produced at the end of each complete frame (conventionally 30 per second) is applied to a delay device 11 and the output pulse from the delay device is applied to a range gate generator 12. As shown in the time chart of FIG. 3, a vertical synchronizing pulse, which appears at D, is delayed for a period from D to E and the range gate generator is triggered into operation at time E. The range gate generator 12 is preferably a monostable multivibrator, which is adjusted to trigger itself to its original state after a time delay slightly less than the frame scanning rate (see FIG. 3). The output of the range gate generator 12 is a pulse whose width is sufficiently long to include the entire dotted raster and is used in other portions of the data processing circuitry such as described in the copending application entitled "Data Processing System" mentioned above. The leading edge of the gate pulse produced by the generator 12 is the time reference for the eventual provision of the gate pulse being produced by gate generator 16. If for some reason the operator adjusts the range gate 12 to scan a new position of the entire dotted raster on the film, the time reference is automatically changed and a proper gate pulse is generated from the generator 16. Symbolic pulse waveforms are shown at the output of each of the circuits to help visualize the operation of the various circuits. The output of the pulse generator 12 is applied to a differentiator 13 and the leading edge X triggers a delay generator 14 into operation. The delay generator 14 may also be a monstable multivibrator of well known type. The generator 14 is adjusted to provide a delay from E to F (FIG. 3), which in the assumed example corresponds to a duration from the 1st to the 14th dot. The output pulse from delay generator 14 is differentiated at 15 and the differentiated pulse shown at Y, corresponding to the trailing edge of the delayed pulse, is applied to trigger search gate generator 16 into operation. The search gate generator 16 may be a monostable multivibrator having a transfer time equal to approximately three or four vertical pulses; for example from F to G in FIG. 1. The output pulse from generator 16 is applied to the other input of search gate 9. Thus, if during the duration of the output from generator 16 a pulse is produced by the counter 6, the search gate produces a signal which operates a relay 17, the relay controlling a circuit for stopping the film drive motor 1.

The code format has now been identified, the film is stopped and the scanning means scans the informational marks from one column to the next in sequence. Circuits are provided for reading out the video pulses corresponding to the data marks. These circuits are not shown, as they do not constitute part of this invention.

The counter 6 is reset at the end of each frame by the application of a vertical synchronizing pulse to a reset amplifier 18, which produces a pulse of suitable polarity and amplitude to reset the counter 6, which in turn opens the inhibit gate 5. The counter 6 is thereby opened for the next frame to receive pulses from the detector 4.

While the foregoing description sets forth the principles of the invention in connection with specific apparatus, it is to be clearly understood that this description is made only by way of example and not as a limitation of the scope of the invention as set forth in the objects thereof and in the accompanying claims.

We claim:

1. A system for reading out coded information bits stored on a record having index bits arranged to designate different areas of said record comprising means for continuously transporting said record in a given direction through a given area; means, independent of said transporting means and operating regardless of the movement or lack of movement of said record, for continuously scanning said given area in sequential frames, each scanning frame consisting of a series of sequential parallel lines transverse to said given direction with the scanning starting from an end of each line and going to the other end to produce an output train of interleaved index and information signals; means for separating the index signals from said information signals; means coupled to said separating means for counting the separated index signals; and means coupled to said counting means for halting said transporting means at a predetermined count to position a selected area of said record in said given area for readout of the information bits therein.

2. The system according to claim 1, wherein said scanning means further comprises a synchronizing pulse generator, gate generator means, means for coupling a vertical synchronizing pulse at the completion of each scanning frame to said gate generator means, said gate generator producing a pulse having a duration equal to the time of a given number of index bits, said given number being a small fraction of the total number of index bits, a coincident gate circuit, means for applying said gated pulse to said gate circuit and means for applying said signal from said counting means to said gate circuit, whereby upon coincidence of said pulse and said signal an output is produced by said gate, the output being an indication that the scanning means is scanning said index bits.

3. The system of claim 2, wherein said informational and index bits are arranged in a plurality of parallel columns and parallel rows, each row consisting of an index mark followed by a plurality of data marks, said scanning means scanning in lines parallel to said rows, said coupling means for coupling the vertical synchronizing pulse to said gate generator means comprising means for delaying said pulse for a period equal to a predetermined number of index pulses but less than the total number of such pulses in a column, said gate generating means being responsive to the trailing edge of the delayed pulses, whereby the gating pulse delivered by said generator occurs over an interval of time between the first and last index pulses in a column and for a duration equal to a small fraction of the total number of such pulses in a column.

4. The system according to claim 3, wherein said predetermined count is less than the total number of index pulses in a column, an inhibit gate coupling said index pulse selecting means to said counting means, a feed-back connection from said counting means to said inhibit gate, said counting means producing a signal upon reaching said predetermined count for operating said inhibit gate to prevent any further pulses from being applied to said counting means, and means for resetting said counting means and opening said inhibit gate at the termination of each frame, whereby said counting means is prepared to receive index pulses through said inhibit gate for the next successive frame.

5. A system for detecting coded informational marks stored on a record, the informational marks being arranged in parallel columns and parallel rows, each row consisting of an index mark followed by a plurality of data marks, comprising record scanning means for scanning said rows in lines parallel thereto and producing pulses corresponding to said index and data marks, means for transporting said record into the field of said scanning means, and a circuit for identifying said coded informational marks divided into two branches, the first branch comprising an index pulse detector coupled to the output of said scanning means, a normally open inhibit gate coupled to the output side of said index pulse detector, a counter preset to deliver an output signal upon counting a predetermined number of index pulses coupled to the output side of said inhibit gate, a feed-back connection from said counter to said inhibit gate for applying a blocking signal to said inhibit gate upon counting said predetermined number of pulses, a search gate coupled to the output of said counter; a second branch of said circuit comprising a range gate generator coupled to the vertical synchronizing pulse output side of said synchronizing pulse generator and operable in response to said pulse, whereby said range gate generator is operated once per scanning frame, said range gate generator producing a pulse of a duration at least equal to the duration of the total number of index pulses in a column, means for differentiating the output of said range gate generator, a delay generator coupled to the output of said differentiating means responsive to the differentiated pulse corresponding to the leading edge of said range gate generator pulse for producing a delayed pulse, the delayed pulse having a duration equal to a predetermined number of index pulses but less than the whole number, means for differentiating said delayed pulse, a search gate generator coupled to the output of said differentiating means and responsive to the pulse corresponding to the trailing edge of said delayed pulse, said search gate generator producing a pulse having a duration equal to a given number of index pulses, the given number being a small fraction of the total number of pulses in a column, and means for applying said search gate pulse to said search gate, whereby upon coincidence of said search gate pulse and the output from said counter, said search gate produces a signal, a control circuit for said record transporting means coupled to the output of said search gate and responsive to the output thereof for stopping said record, and means upon the completion of each scanning frame for applying a vertical synchronizing pulse to reset said counter and to open said inhibit gate.

6. A system for reading out coded information bits stored on a record having index bits arranged to designate different areas of said record comprising means for continuously transporting said record in a given direction through a given area, means, independent of said transporting means and operating regardless of the movement or lack of movement of said record, for continuously scanning said given area to produce an output train of interleaved index and information signals, means for separating the index signals from said information signals, means coupled to said separating means for counting the separated index signals and means coupled to said counting means for halting said transporting means at a predetermined count to position a selected area of said record in said given area for readout of the information bits therein.

7. A system for reading out coded information bits stored on a record having index bits arranged to designate different areas of said record comprising means for continuously transporting said record in a given direction through a given area, means for continuously scanning said given area to produce an output train of interleaved index and information signals, means for separating the index signals from said information signals, means coupled to said separating means for counting the separated index signals and means coupled to said counting means for halting said transporting means at a predetermined count to position a selected area of said record in said given area for readout of the information bits therein.

References Cited in the file of this patent

UNITED STATES PATENTS

| | | |
|---|---|---|
| 2,782,398 | West et al. | Feb. 19, 1957 |
| 2,830,285 | Davis | Apr. 8, 1958 |
| 2,918,657 | Crampton | Dec. 22, 1959 |